(12) United States Patent
Lutz et al.

(10) Patent No.: US 7,983,789 B2
(45) Date of Patent: Jul. 19, 2011

(54) COLLECTING DEBRIS FROM A TOOL

(75) Inventors: Joseph Charles Lutz, Savage, MN (US); YongLing Yu, Singapore (SG); VigneswaraRao Subramaniam, Johor Baru (MY); HwaLiang Ng, Singapore (SG); George P. Thomas, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 502 days.

(21) Appl. No.: 11/855,708

(22) Filed: Sep. 14, 2007

(65) Prior Publication Data
US 2009/0076656 A1    Mar. 19, 2009

(51) Int. Cl.
G06F 19/00 (2011.01)
(52) U.S. Cl. ...................................................... 700/175
(58) Field of Classification Search .................... 700/32, 700/174, 175
See application file for complete search history.

(56) References Cited

U.S. PATENT DOCUMENTS

| | | |
|---|---|---|
| 5,138,390 A | 8/1992 | Miyabayashi et al. |
| 5,227,844 A | 7/1993 | Bhattacharjee et al. |
| 5,235,485 A | 8/1993 | Martin |
| 5,273,329 A | 12/1993 | Wessel |
| 5,401,111 A | 3/1995 | Nubson et al. |
| 5,423,411 A | 6/1995 | Kennett |
| 5,519,910 A | 5/1996 | Messina |
| 5,811,184 A | 9/1998 | Anderson et al. |
| 5,891,259 A | 4/1999 | Ikeda et al. |
| 6,001,472 A | 12/1999 | Ikeda et al. |
| 6,118,289 A | 9/2000 | Kitani et al. |
| 6,175,984 B1 | 1/2001 | Prime et al. |
| 6,430,903 B1 * | 8/2002 | Christiansen et al. ...... 56/10.2 J |
| 6,582,141 B2 | 6/2003 | Meier et al. |
| 6,615,435 B2 | 9/2003 | Randall |
| 6,646,455 B2 | 11/2003 | Maekawa et al. |
| 6,741,086 B2 | 5/2004 | Maekawa et al. |
| 6,744,592 B2 | 6/2004 | Randall |
| 6,777,966 B1 | 8/2004 | Humphrey et al. |
| 6,781,395 B2 | 8/2004 | Maruyama et al. |
| 6,884,300 B2 | 4/2005 | Sato et al. |
| 6,888,344 B2 | 5/2005 | Maekawa et al. |
| 6,956,348 B2 * | 10/2005 | Landry et al. ................. 318/580 |
| 7,065,864 B2 * | 6/2006 | Yamamoto et al. ............. 29/743 |
| 7,093,642 B2 * | 8/2006 | Sharp et al. ................... 156/574 |
| 7,101,033 B2 | 9/2006 | Roche et al. |
| 7,152,271 B2 * | 12/2006 | Pfautz .......................... 15/309.2 |
| 7,204,792 B2 * | 4/2007 | Hagihara et al. ................. 483/7 |
| 7,461,430 B2 * | 12/2008 | Reick-Mitrisin et al. ........ 15/323 |
| 7,487,006 B2 * | 2/2009 | Kamiya et al. ................ 700/183 |
| 2005/0183223 A1 * | 8/2005 | Cheng ..................... 15/104.002 |
| 2007/0074740 A1 * | 4/2007 | Aaron et al. ..................... 134/6 |

* cited by examiner

*Primary Examiner* — Ramesh B Patel
*Assistant Examiner* — Chad Rapp
(74) *Attorney, Agent, or Firm* — Fellers, Snider, et al.

(57) ABSTRACT

An apparatus and associated method for collecting debris from a tool, wherein programming instructions are stored in memory and executed by a machine tool controller, and wherein the controller is responsive to an intermittent debris collect signal in altering an operative path of the tool in order to engage the tool with a debris collecting device.

21 Claims, 7 Drawing Sheets

COLLECTING DEBRIS FROM A TOOL

BACKGROUND

Manufacturing lines have generally evolved through the application of highly sophisticated automation devices and methods. Gains in productivity have been realized as past reliance on human judgment and manipulation is replaced by processor-driven systems. The repeatability of such systems enables the throughput velocity of components to be maximized.

Along with maximizing throughput, there has been a general trend toward performing both fabrication and testing operations at the point of final assembly, rather than building batches of subassemblies ahead of the time they are needed. By scheduling as many parts as possible to be ready "just in time" for final assembly, the utilization of all production equipment supporting final assembly is maximized.

However, these practices inevitably raise some problematic issues that cannot be ignored. For example, fabrication and assembly operations can create debris that, if not controlled, can damage sensitive components. With the continued demand for automated manufacturing lines having ever higher levels of throughput performance, there remains a continual need for improvements in the manner in which such debris is controlled. It is to the furthering of those efforts that the embodiments of the present invention are directed.

SUMMARY OF THE INVENTION

Embodiments of the present invention are directed to an apparatus and associated method for collecting debris from a tool. Programming instructions are stored in memory and executed by a machine tool controller, making the controller responsive to an intermittent debris collect signal in altering an operative path of a tool in order to engage the tool with a debris collecting device.

These and various other features and advantages which characterize the claimed embodiments will become apparent upon reading the following detailed description and upon reviewing the associated drawings.

DETAILED DESCRIPTION

Figure 1:
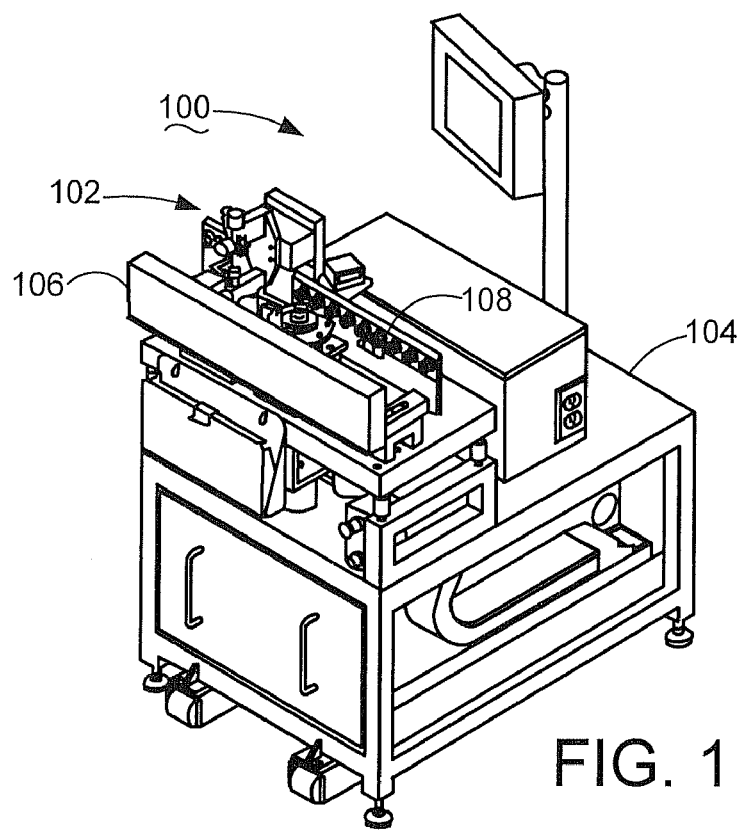
FIG. 1 is an isometric view of an illustrative machine cell.

FIG. 1 depicts a machine cell 100 that is illustrative of an environment that is readily adaptable for using embodiments of the present invention. The cell 100 generally supports a tool arrangement 102 that performs manufacturing and/or assembly operations on an article presented to it. The cell 100 is illustrative of a modular approach wherein a plurality of such cells are joined together to form a manufacturing system, although the present embodiments are not so limited. Particularly, the cell 100 is built upon a frame 104 having rollers to facilitate moving cells into and out of a manufacturing line, or to rearrange the cells as is desired for running different articles down the system. Support mounts are extendible to operably lift the frame 104 off the rollers and to level the frame. A conveyor section 106 can be placed at a standardized elevation in each of adjacent cells to provide a continuous transport system for presenting the articles to each of the tools in the respective cells.

The illustrative cell 100 depicts a balance measurement station in a manufacturing system for producing data storage devices, and is described in detail in U.S. Pat. No. 6,507,992 which is assigned to the present assignee. A pallet (not shown) supporting the data storage device in its various stages of manufacture is transported down the conveyor 106. In the balance measurement station of FIG. 1 a rotary positioner 108 extends upwardly to contactingly engage the motor and disc(s) assembly. In the normal course of events, the repeated contacting engagement can cause particles of debris to cling to the contacting surface of the rotary positioner 108.

Left unchecked, the debris can dislodge from the rotary positioner 108 and ultimately end up inside the data storage device enclosure. There are a number of opportunities for debris trapped inside the enclosure to degrade the performance of the data storage device, if not cause an outright failure mode. For instance, debris can damage sensitive printed circuit board components or precision bearing surfaces, or it can become wedged between the transducer and the data storage medium causing the loss of stored data and/or damage to the transducer and the storage medium.

Figure 2:
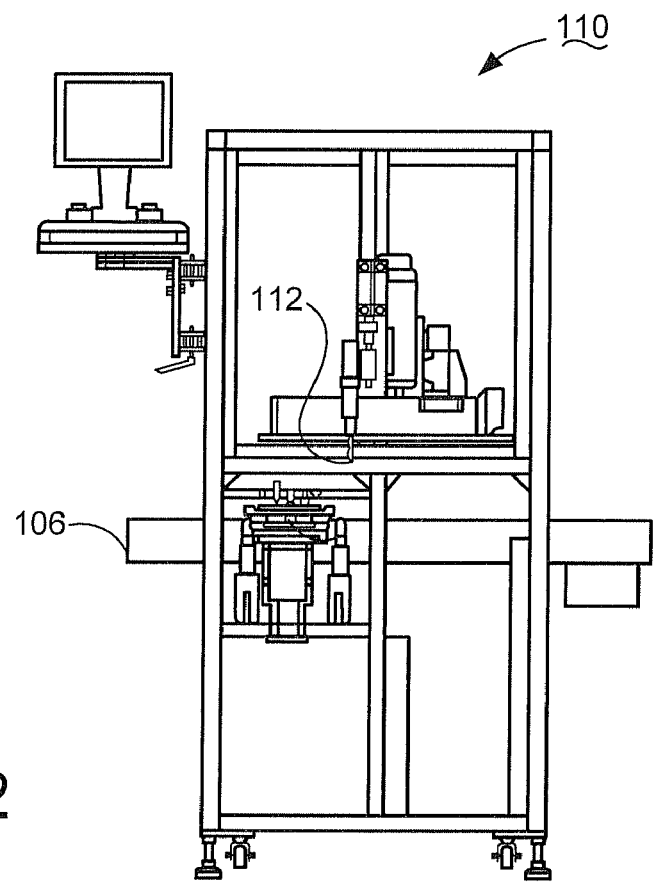
FIG. 2 is an elevational view of another illustrative machine cell.

FIG. 2 depicts another machine cell 110 that is described in detail in U.S. Pat. No. 6,681,659 which is assigned to the present assignee. The pallet is transported into the cell 110 by the section of conveyor 106 to present the data storage device to a tool 112 that is extendable to automatically attach threaded fasteners. However, as above, in the normal course of repeated contacting engagement with the fasteners, the tool 112 can collect debris which is advantageously controlled so as to not end up in the data storage device in accordance with the embodiments of the present invention.

Figure 3:
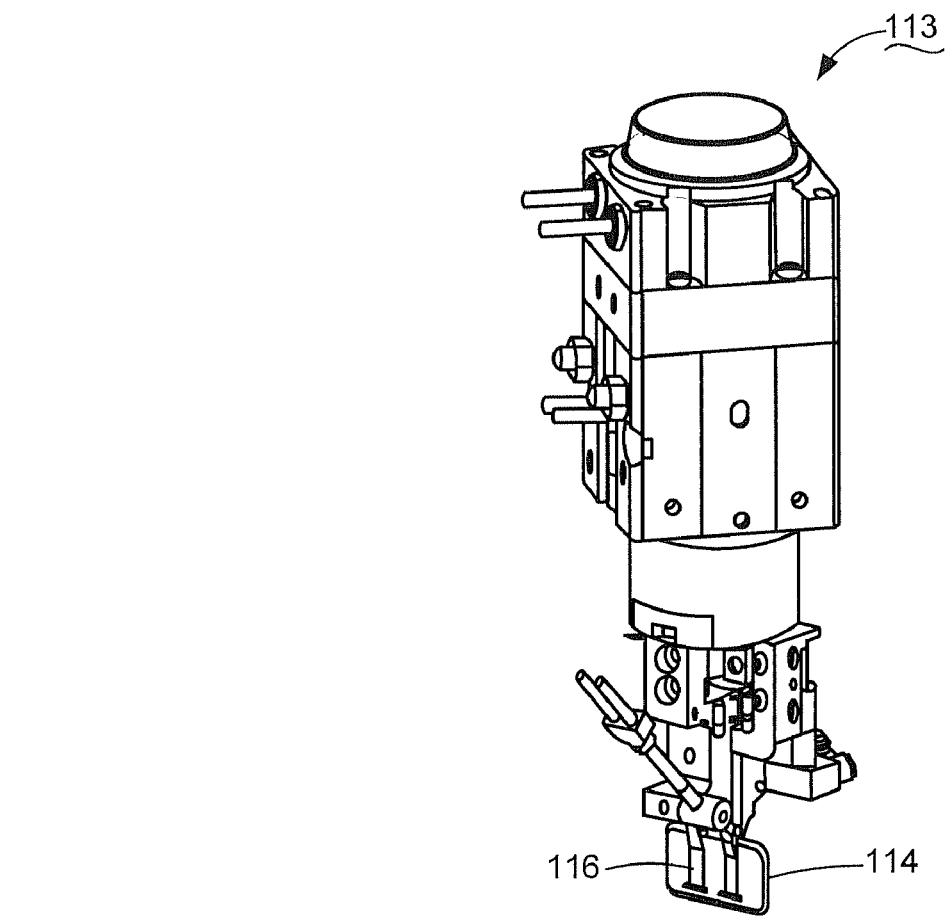
FIGS. 3 and 4 are isometric views of illustrative end effector portions of machine cells.
Figure 4:
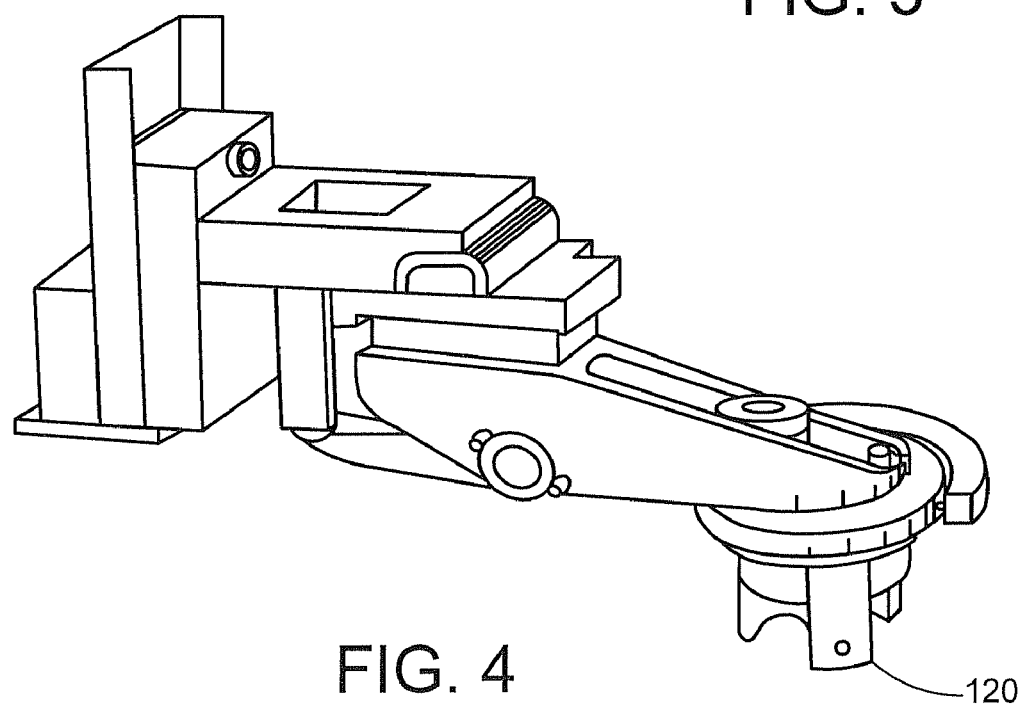

FIG. 3 depicts another illustrative end effector 113 in a machine cell used to install a filter 114 in the data storage device, as is described in detail in U.S. Pat. No. 7,114,243 which is assigned to the present assignee. FIG. 4 is another illustrative end effector 118 in a machine cell that is used to build up alternating discs and spacers into a disc stack, as is described in detail in U.S. Pat. No. 6,877,215 which is assigned to the present assignee. As above, the gripping members 116 of the end effector 113 and the protuberant stub 120 of the end effector 118 can collect debris that is controlled in accordance with the present embodiments.

Figure 5:
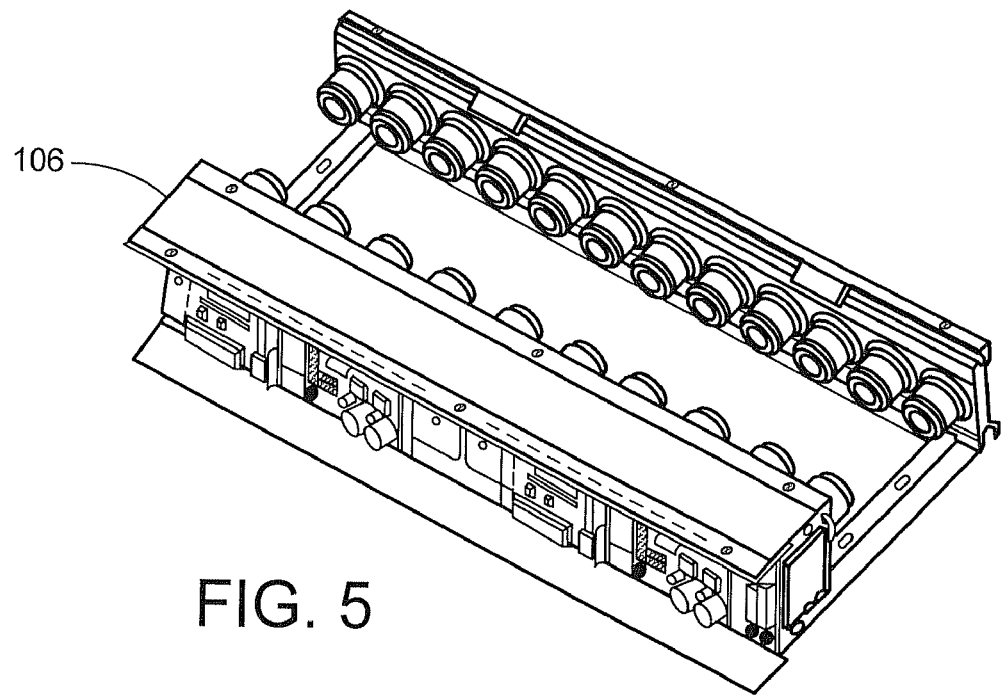
FIGS. 5 and 6 are isometric and end views, respectively, of the roller conveyor portion of the machine cells in FIGS. 1 and 2.
Figure 6:
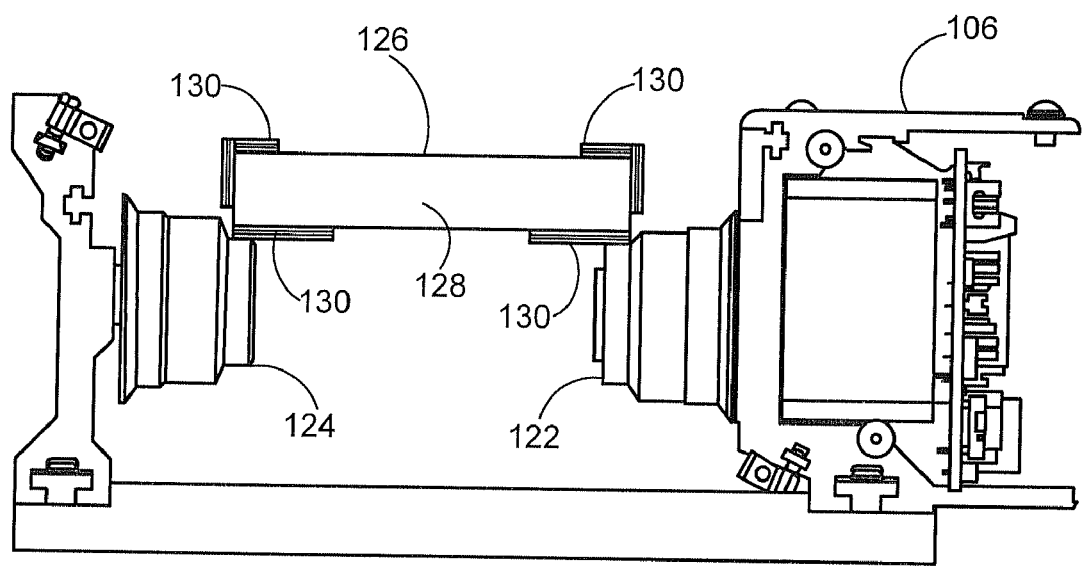

FIG. 5 is an isometric view and FIG. 6 is an end view of the conveyor 106, which in these illustrative embodiments is an intelligent zero pressure accumulation conveyor with flexible zone size capability, such as is described in detail in U.S. Pat. Nos. 6,460,683 and 6,729,463 which are assigned to the present assignee. It will be noted that each of the powered rollers 122 and each corresponding freewheeling roller 124 is stepped for accommodating different size pallets.

FIG. 6 depicts a debris collecting device 126 that is constructed in accordance with embodiments of the present invention. The debris collecting device 126 generally has a body 128 supporting one or more tacky materials that have an exposed adhesive surface 130. The width of the body 128 coincides with the spans of the stepped rollers 122, 124; that is, the body 128 is preferably similar in width to one of the plurality of different widths of pallets that are transported by the conveyor. By placing the tacky materials between the body 128 and the rollers 122, 124, the adhesive surfaces 130 advantageously collect debris from the rollers 122, 124. By making the body 128 substantially the same size as product otherwise being conveyed, the adhesive surfaces are most likely to engage debris caused by the product.

Figure 7B:
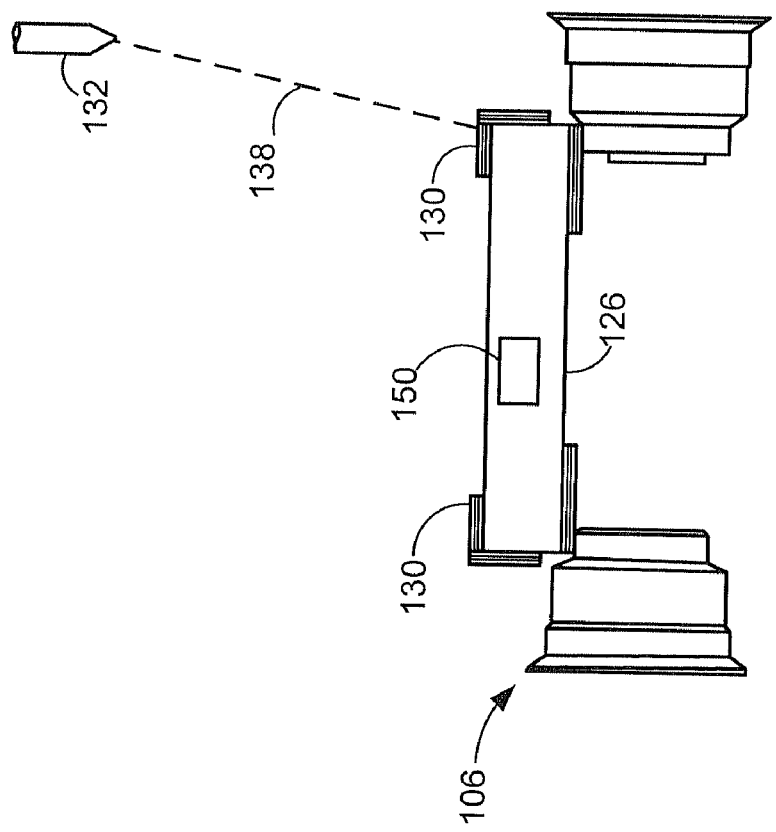
FIGS. 7A and 7B diagrammatically depict an operative path of a tool in relation to a presentation of a pallet and an altered tool path in relation to a presentation of a debris collecting device, respectively.
Figure 7A:
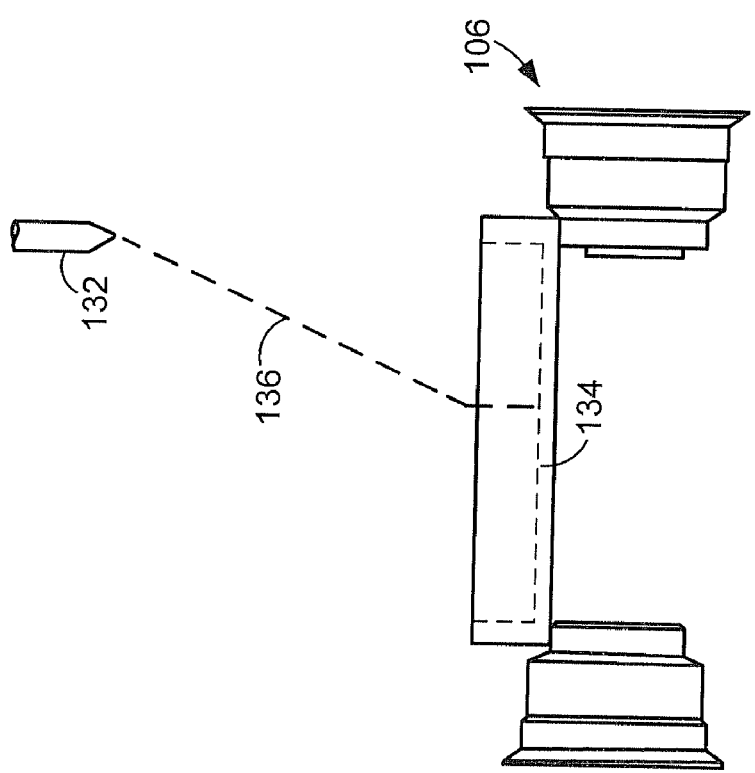

FIGS. 7A and 7B are side-by-side comparisons of operative and alternative tool paths that are selectively imparted to a tool 132 (or "end effector"), depending on whether a manufacturing pallet 134 (FIG. 7A) or a debris collecting device 126 (FIG. 7B) is presented in the machine cell. Although the tool 132 in FIGS. 7A and 7B depicts something akin to a driver bit or a probe, the present embodiments certainly are not so limited and in alternative equivalent embodiments any type of end effector can be employed, such as but not limited to the various end effectors discussed above.

The tool 132 is depicted as starting at a common reference datum position in relation to the conveyor 106 at the start of each cycle. The machine cell (such as 100, 110 in FIGS. 1 and 2) has a processor based controller that executes programming instructions that are stored in memory to precisely move the tool 132. When the pallet 134 is presented in the cell in FIG. 7A, the controller imparts an operative path 136 to the tool 132 to perform a manufacturing task on the article (not shown) that is supported on the pallet 134. Alternatively, when the debris collecting device 126 is presented in the cell in FIG. 7B, the controller imparts an altered path 138 to the tool 132 to engage the tool 132 with the adhesive surface 130. In this manner, any debris that has accumulated on the tool 132 is collected by the debris collecting device 126 and safely transported away, preventing the harmful consequences of the debris otherwise contacting components of the article or winding up in its enclosure.

It will be noted that both the operative path 136 and the alternative path 138 have both lateral and vertical components of trajectory. In alternative equivalent embodiments the paths 136, 138 can have more or fewer such components. For example, in some embodiments the lateral position of the tool 132 can be fixed and only the vertical trajectory might be altered when the debris collecting device 126 is presented in the cell. Alternatively, in addition to the lateral and vertical trajectory components shown, the altered path 138 may also have a longitudinal trajectory component, making it possible to contact the adhesive surface 130 at different longitudinal positions to prevent contact with previously collected debris on the adhesive surface 130.

Figure 8A:
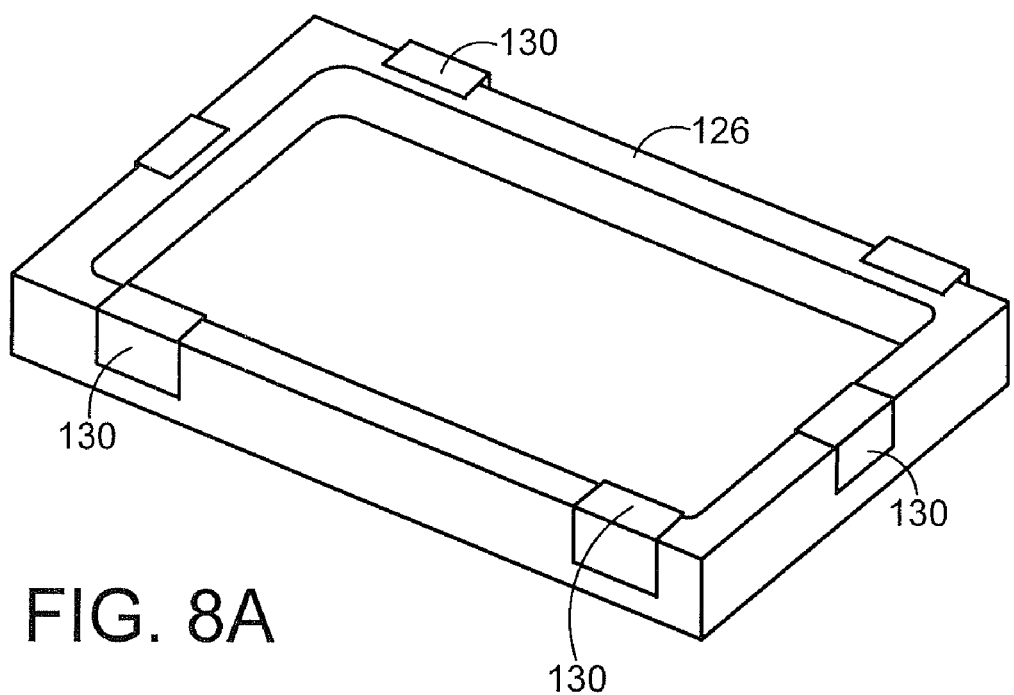
FIGS. 8A and 8B are top and bottom isometric views, respectively, of the debris collecting device in FIG. 6.
Figure 8B:
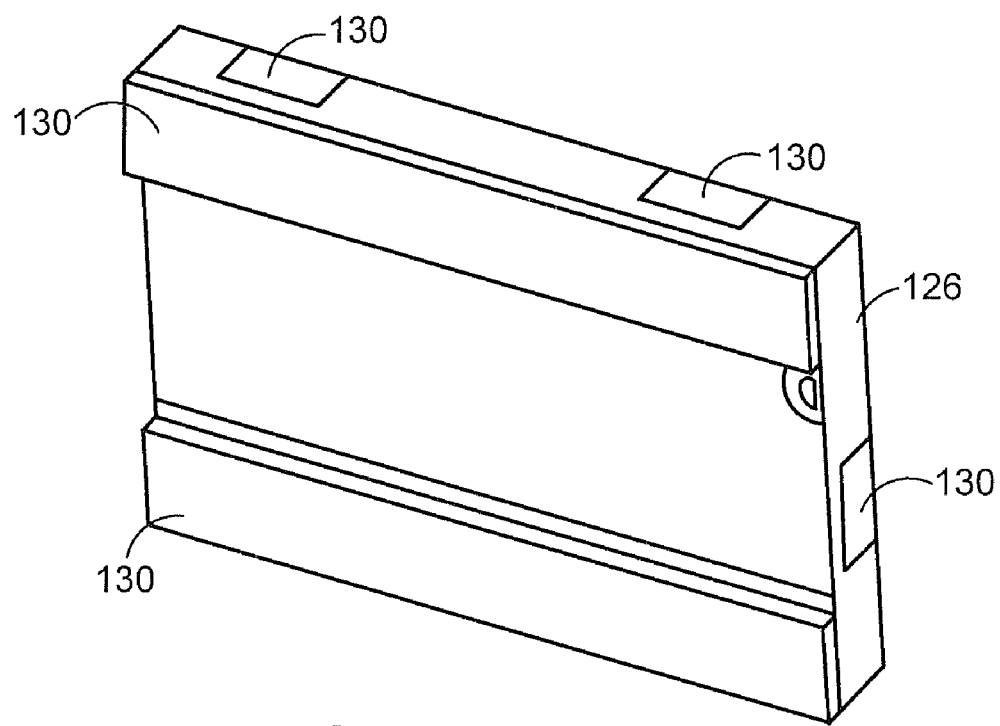
Figure 9:
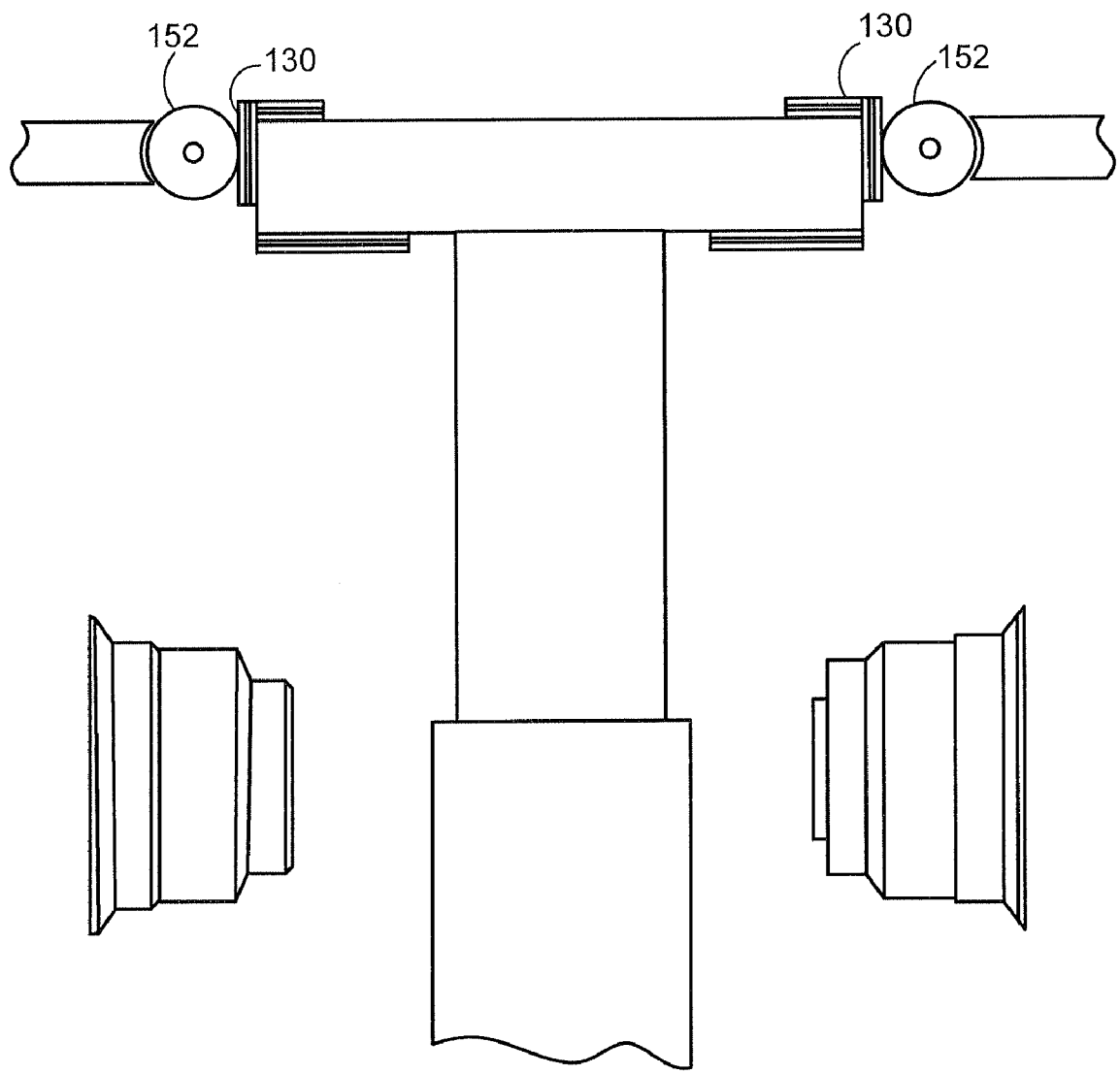
FIG. 9 is an elevational depiction of the debris collecting device cleaning a production fixture.

FIGS. 8A and 8B are isometric depictions of the top-side and bottom-side of the debris collecting device 126. Note that the adhesive surface 130 can be provided on all upstanding sides of the body 128 to clean a fixture into which the debris collecting device 126 is operatively inserted, in the manner described above for cleaning the conveyor 106. FIG. 9, for instance, depicts the debris collecting device 126 having been lifted from the conveyor and inserted between opposing crowders 152. In these illustrative embodiments the adhesive surfaces 130 contact the crowders 152 to clean them in the same manner that the adhesive surfaces 130 on the bottom of the adhesive collecting device 126 clean the rollers 122, 124 (FIG. 6).

Figure 10:
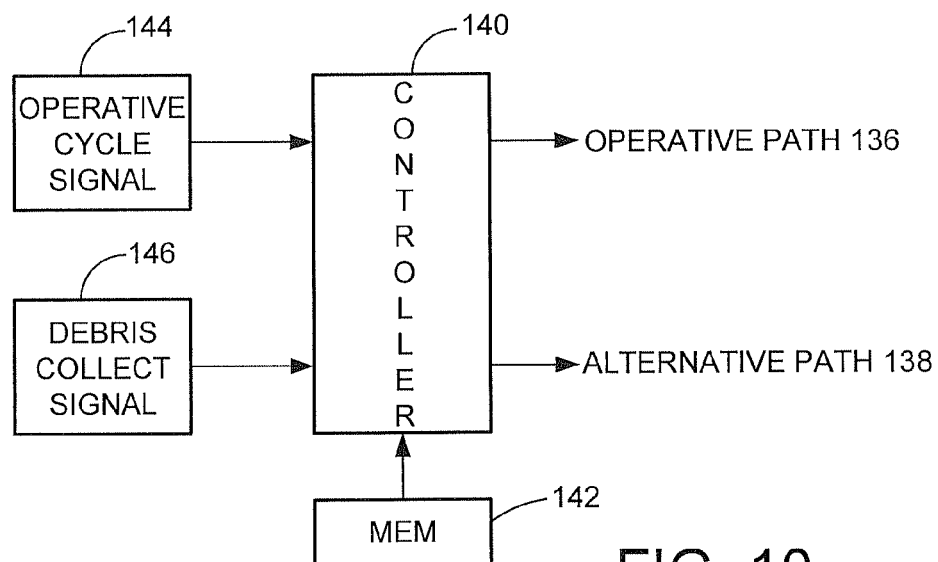
FIG. 10 is a functional block diagram of a portion of the control system of the machine cells in FIGS. 1 and 2.

FIG. 10 is a functional block diagram of a portion of a control system in a machine cell that is constructed in accordance with embodiments of the present invention. As discussed above, a processor based controller 140 executes programming instructions stored in memory 142 to move the tool 132 (FIGS. 7A and 7B). The controller 140 is responsive to an operative cycle signal 144, associated with a pallet 134 (FIG. 7A) being presented in the cell, in imparting the operative path 136 to the tool 132. Alternatively, the controller 140 is responsive to a debris collect signal 146, associated with a debris collecting device 126 (FIG. 7B) being presented in the cell, in imparting the alternative path 138 to the tool 132.

The debris collect signal 146 is intermittently dispersed within the normal course of the machine cell operations. Its frequency of occurrence can be empirically determined in relation to what is minimally necessary to keep the accumulations of debris below a desired level. In some embodiments the debris collect signal 146 can be programmed into the instructions stored in memory 142, such as by correlating its occurrence to a planned deployment of a debris collecting device 126 (FIG. 7B) at regular intervals in the production stream; such as, for example, deploying a debris collecting device 126 after each fifty consecutive pallets 134. Alternatively, the debris collecting device 126 can support a communicative device 150 (FIG. 7B) to communicate adaptively with the controller 140. For example, the communicative device 150 can be a radio frequency identification (RFID) tag. In alternative equivalent illustrative examples the communicative device 150 can be a bar code. In either event the communicative device 150 can signal a distinction between the presence of the debris collecting device 126 or the manufacturing pallet 134.

By integrating the presentations of the debris collecting device 126 into the production flow, the cleaning of debris from the transport device and the tooling can advantageously be performed continuously without stoppages in production. The amount of debris collected by the device 126 can be monitored and used in a statistical approach to adaptively determine the frequency with which the devices 126 should be deployed, or alternatively deciding when to shut down the production line for a more rigorous cleaning procedure. Furthermore, the debris collected can be analyzed to determine its origin, and that information is useful in root cause determination for continually reducing the introduction of debris into the production process.

Preferably, the adhesive surface 130 is provided by using multiple layers of adhesive-coated film. This prolongs the useful life of a debris collecting device 126 before it must be refurbished to renew its debris collecting capability. During reduction to practice of the present embodiments, successful experimentation was conducted by using a product marketed as TackMat™ by Melino Enterprises, Incorporated, of Cranston, R.I., U.S.A. This particular tacky product consists of sixty layers of adhesive-coated film. When a particular adhesive layer 130 becomes ineffective through exposure and/or contamination, then that layer can be easily peeled away to expose a fresh adhesive surface 130. More generally, the adhesive used to produce the adhesive surfaces 130 was successfully made from an epoxy product marketed as DP460 by 3M™ Corporation of St. Paul, Minn., U.S.A.

Figure 11:
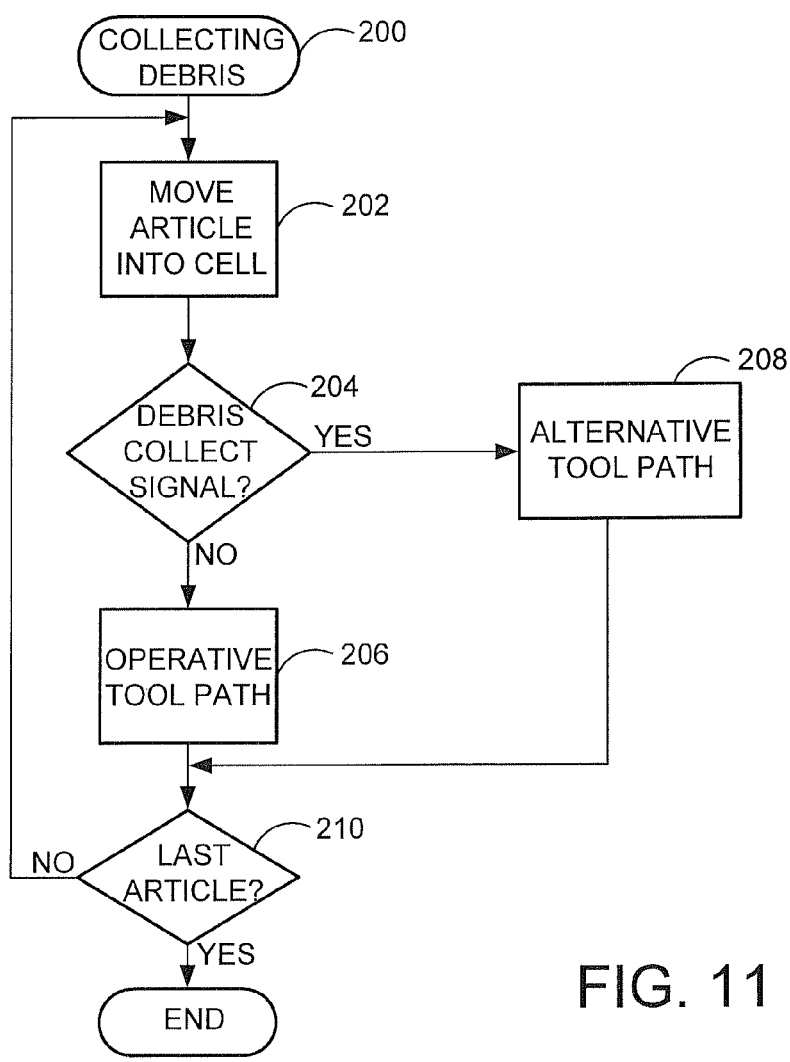
FIG. 11 is a flowchart depicting steps in a method for COLLECTING DEBRIS.

FIG. 11 is a flowchart illustrating steps in a method 200 for COLLECTING DEBRIS in accordance with embodiments of the present invention. The method 200 begins in block 202 with transporting the article to a predetermined position in the machine cell. In block 204 it is determined whether a debris collect signal is associated with the presentation of the article from block 202. If the determination of block 204 is no, then the operative tool path associated with the manufacturing operations is imparted in block 206. On the other hand, if the determination of block 204 is yes, then the alternative tool path associated with engaging the debris collecting device 126 is imparted in block 208. Control then either returns to block 202 with respect to the next article, or the method ends, depending on the determination of block 210.

Generally, the present embodiments contemplate a machine cell having a processor controlling movements of a tool, and means for collecting debris by selectively altering the movements of the tool in response to presentation of a debris collect signal. For purposes of this description and meaning of the appended claims, the term "means for collecting debris" is only associated with the structure disclosed herein and structural equivalents thereof that are capable of executing written programming instructions stored in memory to perform the steps of the method of FIG. 11. "Means for collecting debris" thus does not include previously attempted solutions requiring the tool to be manually manipulated to collect debris from it, or other attempted solutions whereby a collecting member is presented in the operative path of the tool.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to machine cells in a manufacturing line, it will be appreciated by those skilled in the art that the claimed subject matter is not so limited and various other systems can utilize the present embodiments without departing from the spirit and scope of the claimed invention.

What is claimed is:

1. An apparatus that processes a workpiece, comprising:
    a surface that is sized to support the workpiece;
    a tool that is configured to impart a predefined process to the workpiece while the workpiece is supported on the surface; and
    a controller executing programming instructions stored in memory to move the tool along a predetermined operative tool path to impart the predefined process, wherein the controller is responsive to an intermittent debris collect signal in altering a trajectory of the operative tool path in order to engage the tool with a debris collecting device having a collecting feature that operably collects the debris from the tool.

2. The apparatus of claim 1 wherein the controller imparts the operative path to the tool with respect to an article that is presented to the tool via a transport device.

3. The apparatus of claim 2 wherein the debris collecting device is presented to the tool via the transport device.

4. The apparatus of claim 3, wherein the debris collecting device is capable of collecting debris from the transport device.

5. The apparatus of claim 3 wherein the debris collecting device is supported by a body that also supports a communicative device associated with the debris collect signal.

6. The apparatus of claim 4 wherein the transport device comprises a conveyor.

7. The apparatus of claim 3 wherein the debris collecting device comprises an exposed adhesive surface.

8. The apparatus of claim 7 wherein the debris collecting device comprises multiple layers of adhesive-coated film.

9. A method comprising:
    executing a first control mode on a tool imparting an operative path associated with operating the tool;
    receiving a debris collect signal; and
    executing a second control mode in response to the debris collect signal altering a trajectory of the operative path to engage the tool with a debris collecting device having a collecting feature that collects the debris from the tool.

10. The method of claim 9 wherein the executing steps are characterized by programming instructions stored in memory that are executed by a processor based controller.

11. The method of claim 10 wherein the receiving step is performed intermittently in relation to the first control mode.

12. The method of claim 11 wherein the executing a first control mode step is characterized by transporting an article to a predetermined position in relation to the operative path.

13. The method of claim 12 wherein the executing a second control mode step is characterized by transporting the debris collecting device to a predetermined position in relation to the tool.

14. The method of claim 13 further comprising collecting debris from a transport device with the debris collecting device.

15. The method of claim 13 wherein the receiving a debris collect signal step is characterized in association with an arrival of the debris collecting device at the predetermined position.

16. The method of claim 15 wherein the receiving debris collect signal step is characterized by a communication signal selected from a set consisting of an RFID signal and a bar code scanner signal.

17. The method of claim 16 wherein the executing a second control mode step is characterized by contacting the tool against an exposed adhesive surface.

18. An apparatus that processes a workpiece, comprising:
    a surface that is sized to support the workpiece;
    a tool that is configured to impart a predefined process to the workpiece while the workpiece is supported on the surface;
    a debris monitor that non-manually generates a debris collect signal when a predefined criteria exceeds a threshold; and
    a controller executing programming instructions stored in memory to move the tool along a predetermined operative tool path to impart the predefined process, the controller being responsive to the generated debris collect signal in altering a trajectory of the operative tool path in order to engage the tool with a debris collecting device having a collecting feature capable of collecting debris from the tool.

19. The apparatus of claim 18 wherein the debris monitor generates the debris collect signal when a number of the process cycles exceeds the threshold number of process cycles.

20. The apparatus of claim 18 wherein the debris monitor generates the debris collect signal when an amount of debris accumulated on the tool exceeds the threshold amount of debris.

21. The apparatus of claim 18 wherein the debris monitor generates the debris collect signal when an elapsed time exceeds threshold interval of time.

* * * * *